Feb. 18, 1958     O. H. BANKER     2,823,777
HYDRAULIC CLUTCH CONSTRUCTION
Original Filed Nov. 5, 1948
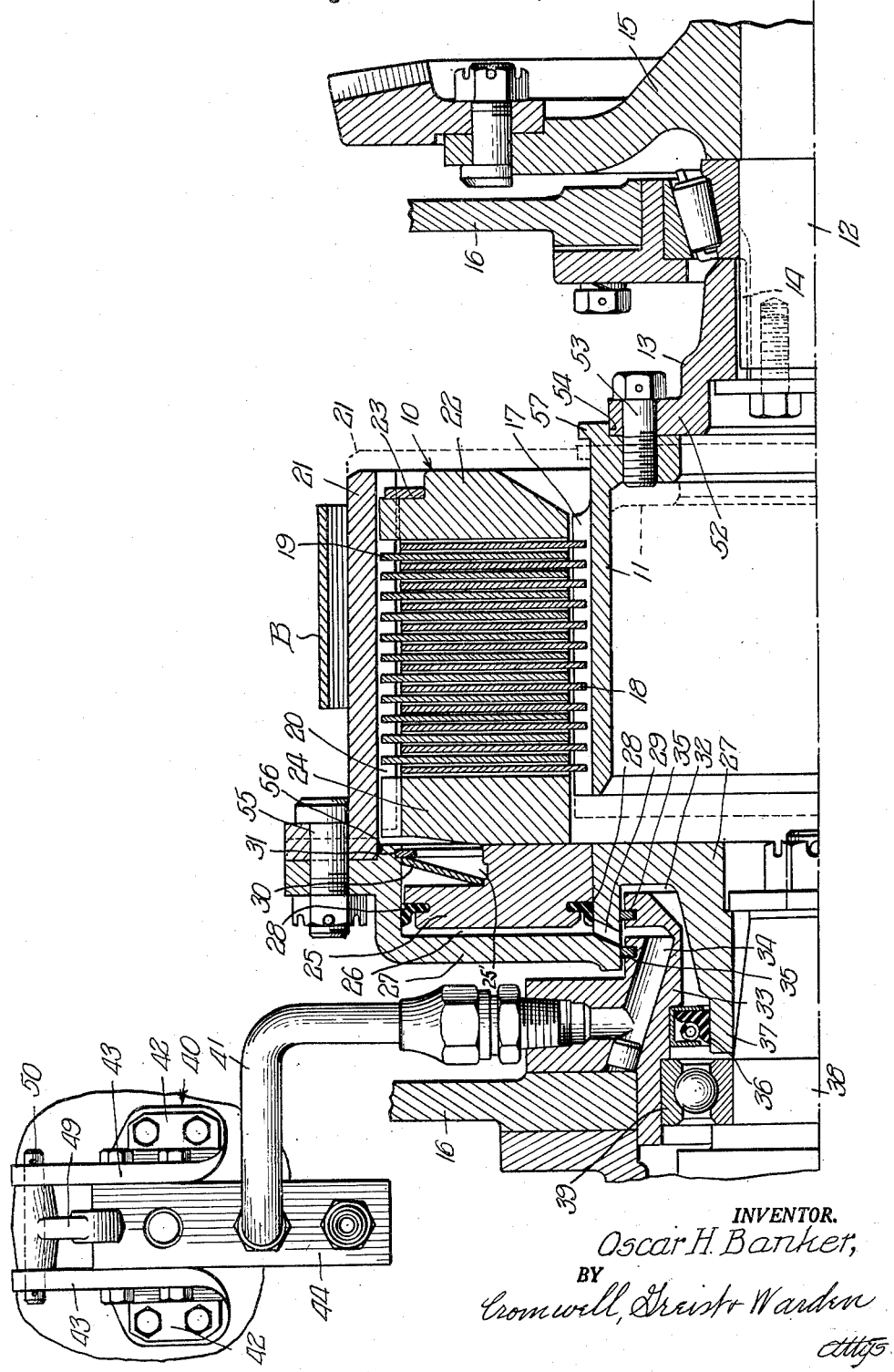
INVENTOR.
Oscar H. Banker,
BY
Cromwell, Greist & Warden
Attys.

United States Patent Office 2,823,777
Patented Feb. 18, 1958

2,823,777

HYDRAULIC CLUTCH CONSTRUCTION

Oscar H. Banker, Evanston, Ill., assignor to New Products Corporation, Chicago, Ill., a corporation of Delaware Original application November 5, 1948, Serial No. 58,414, now Patent No. 2,669,330, dated February 16, 1954. Divided and this application November 9, 1953, Serial No. 390,808

7 Claims. (Cl. 192—85)

The present invention pertains to an improved hydraulically controlled clutch mechanism operable upon the dropping of hydraulic pressure thereon to provide a variable torque, slip-drive operation of a unit controlled by said mechanism. The clutch of the invention is particularly well suited for application to a driving and steering mechanism for tractors and the like, in which coaxial output shafts are individually controlled to govern turning. This is a division of my copending Patent No. 2,669,330 entitled, Hydraulic Control for Steering Clutches, granted February 16, 1954.

A general object of the invention is to provide a hydraulically controlled clutch of the foregoing type which is simple, sturdy and inexpensive in its parts, and adapted for a long life of satisfactory operation, yet having provision to very quickly and easily dismantle the same as a unit from its hydraulic pressure supply line and coacting fittings and from other coacting power transmitting means with which the clutch is associated, when this is desirable for the purpose of inspection, repair or replacement of any part. The operation is performed without in any degree disarranging the coacting units referred to.

More specifically the invention provides a hydraulically controlled steering clutch having coaxial, axially telescoped, drum-like driving and driven members and novel structural provisions to pilot the same at their ends in reference to an annular driver shaft unit and to an annular hydraulic supply unit, respectively. These units are both rotary, the hydraulic unit having a liquid tight journal on a fixed, valve controlled hydraulic supply fitting. The arrangement is such that the clutch drum members, together with clutch disks which drivingly unite the same in operation, may be easily loosened and dropped transversely of the axes of their respective pilots, for the purposes noted above. The driver and hydraulic supply units remain undisturbed to permit ready subsequent reassembly of the members to the units when desired.

The foregoing statements are indicative in a general way of the nature of the invention, but other and more specific objects will be apparent to those skilled in the art upon a full understanding of the construction and operation of the clutch and its decoupling provisions.

A single embodiment of the invention is presented herein for purpose of exemplification. It will be appreciated that the invention is susceptible of incorporation in still other modified forms coming equally within the scope of the appended claims.

The figure is a fragmentary view in vertical, axial section through a hydraulically operated steering clutch mechanism according to the invention, adapted to be variably controlled by a graduated pressure reduction valve illustrated in elevation in its operative, installed relation to said mechanism.

Referring to the drawing, the reference numeral 10 generally designates a disk-type steering clutch for a tractor or like piece of equipment, it being understood that this structure is reproduced on the opposite side of a central driver for the assembly, to be referred to. This clutch includes an internal, drum-like driving member 11 which is drivingly secured to a main drive shaft 12 by means of a drive ring 13 bolted on said drum and keyed or splined at 14 to said drive shaft. A retainer ring bolted to shaft 12 holds said drive ring in proper position. Shaft 12 is driven by a bevel gear 15 keyed thereon, and suitable bearing provisions are made for rotatably mounting the shaft and other components of the assembly in a housing 16 of the structure.

The driving drum 11 is provided with external, elongated splines 17 receiving the friction clutch disks 18 in a non-rotative, axially slidable relation thereto. Another set of clutch disks 19 is similarly splined at 20 on an external driven drum 21 which is axially telescoped over the internal drum 11. An annular abutment plate 22 is also drivingly engaged with the splines 20 and is restrained in the axial direction by means of a retainer ring 23 associated with drum 21 in the manner illustrated. A conventional brake band B surrounds drum 21.

An annular pressure plate 24 is splined to drum 21 at the opposite end of the clutch disk assembly and is normally pressure urged to the right to apply clutch engaging pressure on disks 18 and 19. An annular piston 25 is mounted for axial movement in an annular cylinder 26 which is defined in and by a shaped end member 27 of the clutch drum assembly, said member being bolted on the drum 21 for rotation therewith. Piston 25 is appropriately sealed to retain hydraulic pressure in the cylinder rearwardly thereof, as by means of a pair of conventional, annular oil seals 28, and hydraulic pressure is admitted to the cylinder through the inclined passages or ports 29 in member 27. An annular, dished Belleville-type spring 30 normally urges the piston 25 to the left, the internal and external peripheries of said spring being engageable with said piston and with a retainer snap ring 31 which is fixedly associated with drum end member 27.

End member 27 is shaped to provide an annular bearing recess 32 which receives a cylindrical, hydraulic pressure distributor head 33 fixed in the housing 16. This head is bored to provide a passage 34 through which hydraulic pressure liquid, such as a good grade of lubricating oil, is supplied to the cylinder 26 by means of port 29. Appropriate annular sealing rings 35 are disposed in parallel grooves on said head on either side of port 29 to prevent leakage of the liquid. A conventional oil seal 36 is applied to the pressure distributor head 33 between the latter and a hub extension 37 of the shaped drum end member 27, to prevent leakage at this point. Said hub is appropriately secured in driving relation to the driven shaft 38, which is mounted by a ball bearing 39 in the interior of the hydraulic head 33.

The passage 34 through which hydraulic pressure is supplied to and voided from the clutch cylinder 26 is communicated with a pressure reduction valve of the sort shown in my copending patent identified above, here generally designated 40, by means of a suitable pipe or other conduit 41, tapped in the hydraulic head 33 in the fashion illustrated. The valve 40 is mounted by an appropriate bracket 42 on a suitable support, for example, the clutch housing 16, and this bracket may include a pair of outwardly extending, laterally spaced, fork-like arms 43. A bell crank 49 pivoted at 50 on the bracket arms 43, and connected with any suitable type of operator controlled actuating lever, linkage or the like, is employed to control valve 40. Valve 40 is connected to a pump, not shown.

In the operation of clutch 10, full hydraulic pressure of about 80 pounds per square inch is normally made effective on cylinder 26 and annular piston 25 by valve 40, with the result that the clutch is fully applied against the force of Belleville spring 30, to positively lock the drums 11, 21 for rotation as a unit.

If it is desired to produce slight slip between the clutch disks, with an attendant proportionate relative rotation of drums 11, 21, the valve bell crank 49 is actuated a predetermined amount to by-pass a certain volume of hydraulic liquid through valve 40 to a low pressure receiver. Attendant pressure reduction in clutch cylinder 26 results in partial slip of the clutch, and the slip-producing pressure is maintained at the reduced value. This condition obtains until the valve is again actuated for a further pressure drop or, if desired, the bell crank 49 is released, enabling full line pressure to again become effective on the clutch.

The above described regulation of hydraulic pressure by manual operation to dump a desired pressure increment, followed by automatic spring re-sealing of the valve, affords a highly flexible and versatile control device operating on the principle of variable pressure reduction, as contrasted with variable pressure increase. Further details of valve 40 by which it is accomplished are shown and described in my copending patent, as are the arrangements whereby the improved clutch construction is embodied in a dual drive steering assembly.

The present invention relates to improved specific structural features of clutch 10, dealing particularly with the matter of facilitating and expediting disassembly or dismantling of the clutch as a unit from the driving and hydraulic control assemblies associated therewith.

For this purpose the internally splined clutch drum 11 is secured to an outwardly extending flange 52 on the driving ring 13, by means of bolts 53, and said drum is circumferentially recessed internally of its outer periphery, at 54, to provide an annular pilot shoulder which telescopes over flange 52. The outer splined control drum 21 is constructed separate from the shaped, hydraulic cylinder-defining end member 27 thereof, being rigidly clamped to said member by bolts 55 at adjacent radial flanges of said drum and end member. Drum 21 is piloted on an annular shoulder 56 machined on the right-hand face of end member 27.

When it is desired to remove the assembly of clutch drums 11, 21, abutment or backing plate 22, pressure plate or member 24 and the clutch disks 18, 19 from the unit, as for servicing, repair or replacement of parts, this is simply and quickly performed in the following manner: The bolts 53 are removed and the internal drum 11 is slid to the left, as indicated in dotted lines, until its pilot shoulder 54 is clear of the driving ring flange 52. Bolts 55 are then removed and the outer drum 21 is slid to the right to clear it from the pilot shoulder 56 of end member 27, also as shown in dotted line, thus separating said drum from said end member and further telescoping drums 11 and 21 relative to one another. Assuming that the brake band B has been previously disassembled from the various levers and links which operate the same (not shown) the band may then be utilized to lift the clutch sub-assembly, including the parts enumerated above, out of the clutch chamber of the housing 16.

Following the intended repairs, this sub-assembly is re-assembled by dropping it down into the casing, piloting external drum 21 on end pilot shoulder 56, bolting said drum to the end member, and piloting and bolting the internal drum on the driving ring flange 52. This last named operation is facilitated by the provision of an annular shoulder 57 on the right-hand external periphery of said drum, for the reception of a crowbar or like implement to assist in shifting the drum toward the right and over the flange 52. These operations of removal and replacement of the clutch parts are accomplished without disturbing either the hydraulic installation to the left thereof or the driving components to the right.

I will be noted that the annular recessing of the hydraulic piston 25 at 25' affords a chamber receiving the Belleville spring 30 and snap ring 31 by which the latter is supported to act on the piston. Thus the entire hydraulic unit of the clutch is held in assembly when the above described operations are performed. A very desirable overall compactness of structure is a further result.

I claim:

1. A hydraulically controlled clutch or like assembly comprising a pair of coaxial, cylindrical drum-like clutch members disposed in substantially telescoped relation to one another, frictional clutch disks disposed between and drivingly connected to said respective clutch members, an end element releasably secured concentrically to one of said clutch members, said end element being provided with a circumferential pilot surface on which said one clutch member is releasably received in axially overlapping relation, and being shaped to provide an annular pressure cylinder therein which opens axially toward said clutch disks, means rotatively mounting said end element and thus rotatably supporting said one clutch member, means releasably securing said element and said one clutch member in assembled overlapped relation, a rotatable supporting member for the other clutch member having a circumferential pilot surface supporting said other clutch member in axially overlapping relation thereto, means releasably securing said other clutch member in assembled, overlapped relation to said last named pilot surface, said clutch members being axially shiftable from said respective pilot surfaces upon release of said respective securing means, to thereby free the same for radial withdrawal from said respective mounting means and supporting member, an annular piston in said cylinder having an annular recess opening in the same direction as said cylinder, and a spring in said recess urging said piston axially in said cylinder in a direction to hold the piston therein.

2. In a hydraulically controlled clutch, a rotatable drum comprising an end element which is axially recessed to provide an axially exposed, annular pressure cylinder and which is provided with an annular bearing portion ported for pressure communication with said cylinder, and a drum element releasably secured on an annular pilot surface of said end element on the exposed side of said cylinder, a bearing rotatably supporting said bearing portion and provided with a fluid supply passage communicating with said cylinder, an annular piston disposed in said cylinder, said piston having an annular recess on the side thereof facing said drum element, and a spring disposed in said last named recess in axial thrust transmitting relation to said piston and end element, said piston and spring being wholly housed in said annular cylinder.

3. In a hydraulically controlled clutch, a first rotatable drum comprising an end element which is axially recessed to provide a laterally exposed, annular pressure cylinder, a first drum element releasably secured on an annular pilot surface of said end element on the exposed side of said cylinder, an annular piston disposed in said cylinder, said piston having an annular recess on the side thereof facing said first drum element, and a spring disposed in said last named recess in axial thrust transmitting relation to said piston and end element, said piston and spring being wholly housed in said annular cylinder, a further rotatable drum including a further drum element in axially telescoped relation to said first drum element, clutch members drivingly connected to said respective drum elements and a rotatable support having an annular pilot surface on which said further drum element is releasably received at its end opposite said first drum end element.

4. In a hydraulically controlled clutch, a first rotatable drum comprising an end element which is axially recessed to provide a laterally exposed, annular pressure cylinder and which is provided with an annular bearing portion ported for pressure communication with said cylinder, a first drum element releasably secured on an annular pilot surface of said end element on the exposed side of said cylinder, a bearing rotatably supporting said bearing portion and provided with a fluid supply passage communicating with said cylinder, an annular piston disposed in said cylinder, said piston having an annular recess on the side thereof facing said first drum element, and a spring disposed in said last named recess in axial thrust transmitting relation to said piston and end element, said piston and spring being wholly housed in said annular cylinder, a further rotatable drum including a further drum element in axially telescoped relation to said first drum element, clutch members drivingly connected to said respective drum elements and a rotatable support having an annular pilot surface on which said further drum element is releasably received at its end opposite said first drum end element.

5. A hydraulically controlled clutch or like assembly comprising a pair of coaxial cylindrical drum-like clutch members disposed in substantially telescoped relation to one another, friction clutch disks disposed between and drivingly connected to said respective clutch members, an end element located concentrically to one of said clutch members, means releasably securing said one clutch member to said end element, said end element being shaped to provide an annular pressure cylinder therein which opens axially toward said clutch disks, an annular piston in said cylinder having an annular recess opening in the same direction as said cylinder, a spring in said recess urging said piston axially in said cylinder in a direction to hold the piston therein, a rotatable supporting member for the other clutch member, and means releasably securing said other clutch member to said supporting member, said clutch members being axially shiftable upon release of said respective securing means to free the same for radial withdrawal from the end element and supporting member.

6. A hydraulically controlled clutch or like assembly comprising a pair of coaxial cylindrical drum-like clutch members disposed in substantially telescoped relation to one another, friction clutch disks disposed between and drivingly connected to said respective clutch members, an end element located concentrically to one of said clutch members, said end element being shaped to provide an annular pressure cylinder therein which opens axially toward said clutch disks, an annular piston in said cylinder having an annular recess opening in the same direction as said cylinder, a spring in said recess urging said piston axially in said cylinder in a direction to hold the piston therein, said one clutch member being releasably piloted on an annular surface of said end element on the exposed side of said cylinder, means releasably securing said clutch member to said end element, a rotatable supporting member for the other clutch member having an annular surface on which said other clutch member is releasably piloted, means releasably securing said other clutch member in assembled relation with said supporting member, said clutch members being axially shiftable from said respective pilot surfaces upon release of said respective securing means to thereby free the same for radial withdrawal from the end element and supporting member.

7. A hydraulically controlled clutch or like assembly comprising a pair of coaxial cylindrical drum-like clutch members disposed in substantially telescoped relation to one another, friction clutch disks disposed between and drivingly connected to said respective clutch members, an end element located concentrically to one of said clutch members, said end element being shaped to provide an annular pressure cylinder therein which opens axially toward said clutch disks, said one clutch member being supported on an annular pilot surface of said end element on the exposed side of said cylinder, an annular piston in said cylinder having an annular recess opening in the same direction as said cylinder, a spring in said recess urging said piston axially in said cylinder in a direction to hold the piston therein, an annular bearing portion forming a part of said end element and being ported for pressure communication with said cylinder, a bearing rotatably supporting said bearing portion and provided with a fluid supply passage communicating with said cylinder, means releasably securing said one clutch member in assembled relation with said end element, a rotatable supporting member for the other clutch member having an outer annular pilot surface supporting said other clutch member, means releasably securing said other clutch member in assembled relation to said supporting member, said clutch members being axially shiftable from the supporting surfaces of the end element and supporting member upon release of said securing means to thereby free the same for radial withdrawal out of operative position.

References Cited in the file of this patent

UNITED STATES PATENTS

| | | |
|---|---|---|
| 2,002,367 | Fahrney | May 21, 1935 |
| 2,018,014 | Fahrney | Oct. 22, 1935 |
| 2,462,825 | Zimmerman et al. | Feb. 22, 1949 |
| 2,562,515 | Wemp | July 31, 1951 |
| 2,599,214 | Wemp | June 3, 1952 |
| 2,632,543 | Wilson | Mar. 24, 1953 |